Dec. 22, 1942.  L. F. WOODRUFF  2,305,834
RECORDER
Filed Aug. 24, 1938   4 Sheets-Sheet 1

Inventor:
Louis F. Woodruff
By Dike, Calver + Gray
Attorneys.

Dec. 22, 1942.   L. F. WOODRUFF   2,305,834
RECORDER
Filed Aug. 24, 1938   4 Sheets-Sheet 3

Inventor:
Louis F. Woodruff
By Dike, Calver + Gray
Attorneys.

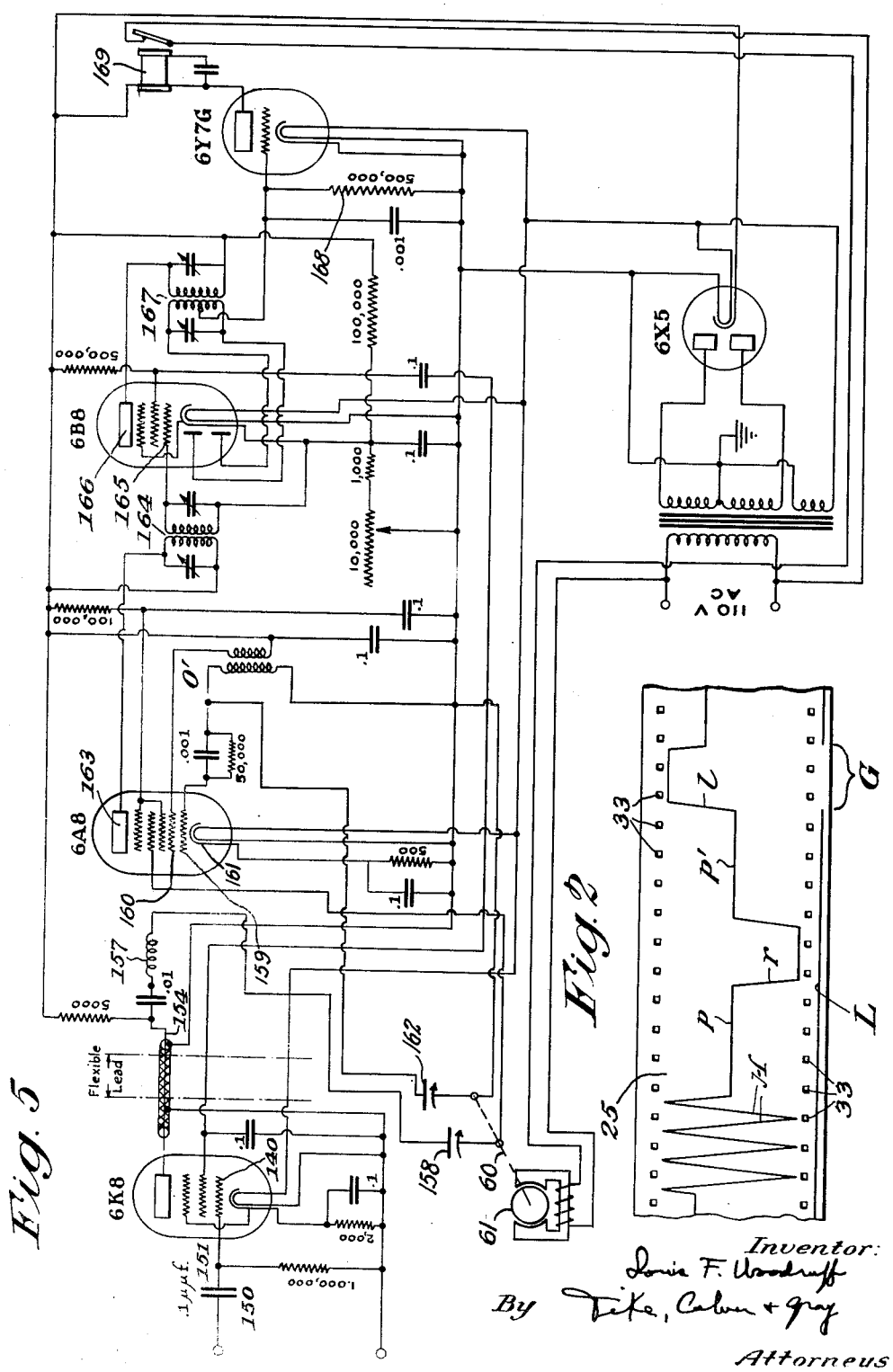

Patented Dec. 22, 1942

2,305,834

UNITED STATES PATENT OFFICE 2,305,834

RECORDER

Louis F. Woodruff, Wellesley, Mass., assignor to A. C. Nielsen Company, Chicago, Ill., a corporation of Illinois Application August 24, 1938, Serial No. 226,606

14 Claims. (Cl. 234—1.5)

In recent years manufacturers and merchants have utilized the radio for advertising purposes by sponsoring entertaining programs of various types. For this reason particularly it has become desirable to determine the types of programs which appeal to radio listeners. To accomplish this, it has been proposed to build into each radio receiving instrument a recorder which will produce a record of the various broadcasting stations to which the radio receiving instrument has been tuned and the time period during which each station was tuned in. This, however, is not entirely satisfactory because it requires special design of the receiving instrument and is too expensive.

It is an object of the present invention to provide an accurate recorder which can be readily connected to any radio receiving instrument at any time and for any desired period thereby making possible the determination of the listening habits of listeners with a relatively small number of recorders.

It is another object of the invention to provide a recorder which may be used with any radio receiving instrument having either a variable condenser or a fixed condenser operated by a push button or one having a combination of variable and fixed condensers.

The invention will be more clearly understood from the following description in conjunction with the accompanying drawings: in which, Fig. 1 is a diagrammatic view illustrating one embodiment of the invention;

Fig. 4 is a diagrammatic view of apparatus which may be used in place of a portion of that illustrated in Fig. 1; and Fig. 5 is a diagrammatic view of apparatus which may be used in place of that illustrated in Fig. 4.

Figure 1:
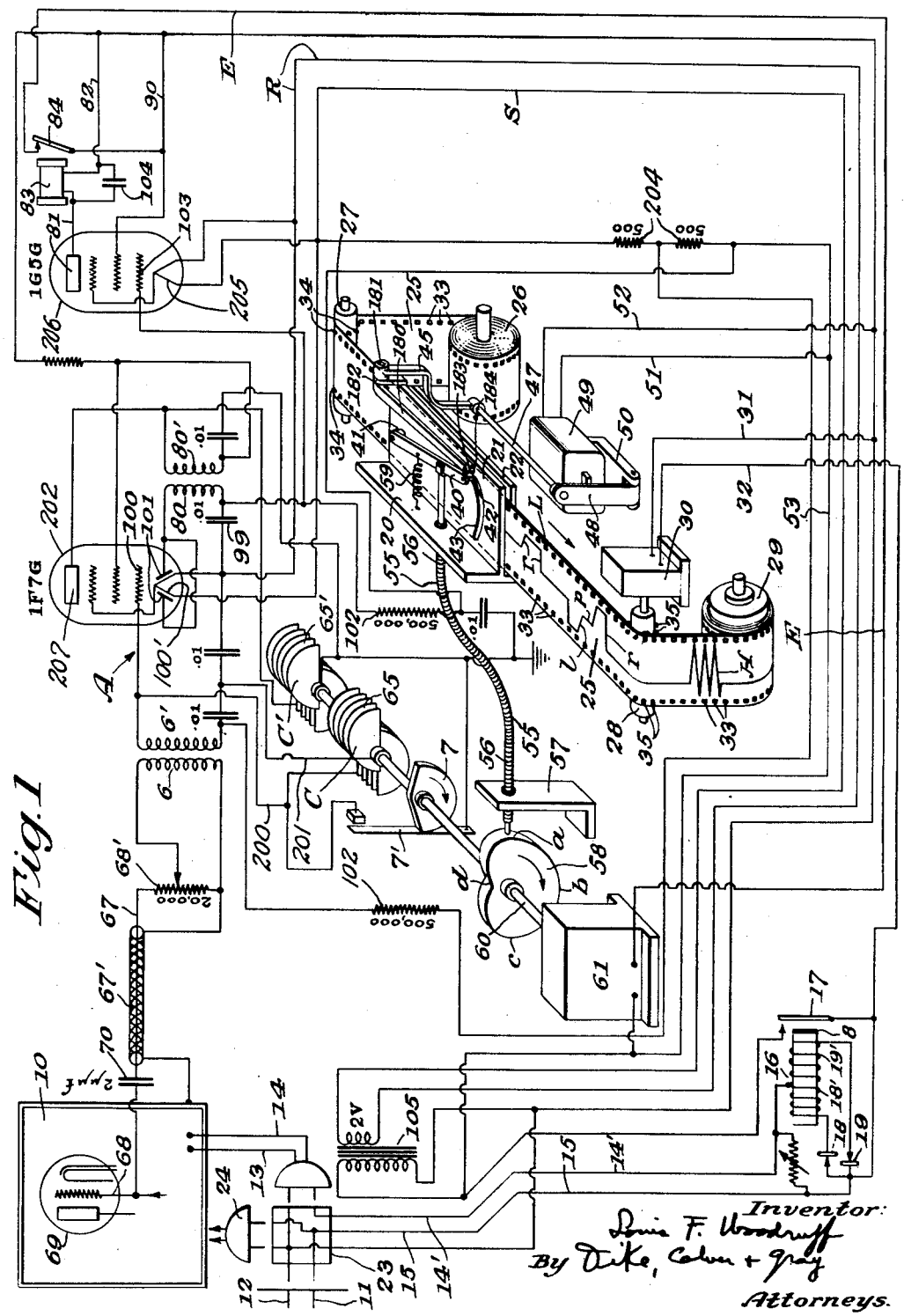

In Fig. 1 of the accompanying drawings, there is illustrated a radio receiving instrument 10 supplied with power from a source of alternating current indicated by the conductors 11 and 12. Thus, the instrument 10 is connected, through a spaced three-way socket 23 having wiring as shown, with the conductor 12 by a lead 13 and is connected to the conductor 11 by leads 14, 14' and 15 between the latter two of which is interposed a relay 16 adapted to actuate a switch 17 for a purpose described hereinafter. For convenience, power may be obtained from the socket 23 through plug 24 for general household uses without disturbing the power supply to clock motor 30 referred to hereinafter.

Relay 16 has two equal windings 18' and 19' having a common terminal at one end. The other ends of the windings 18' and 19' are connected to the oppositely directed rectifier elements 18 and 19. When lead 15 is of positive potential current can flow only through rectifier element 18 and winding 18' and thus to lead 14'. Current is prevented from flowing through winding 19' during the half cycle when lead 15 is positive by the familiar blocking action of the element 19 of the rectifier. When lead 15 becomes negative during the next half cycle, current can flow through rectifier element 19 and winding 19', and not through element 18 and winding 18', the return path again being provided by lead 14'. In each case, as may be seen from the drawings, the current which does flow passes always in the same direction around the core of relay 16 and thus causes a magnetic flux always in one direction. The short-circuited ring 8 is provided around the end of the relay core to make the armature slow to release. Thus, the well known tendency of alternating-current relays to vibrate and chatter is overcome. The entire relay and rectifier element is supplied by the circuit 15 and 14' which is in series with the radio-receiving set 10. Thus, the switch 17 is closed at all times when the radio-receiving set is in operation and is open when the set is not in operation. Shunt variable resistance 3 in parallel with the relay and rectifier combination is provided to permit manual adjustment of the proportion of the radio-set current which flows through the relay 16.

The recorder comprises a support 20 carrying a shelf 21 and a table 22 which extends beneath the shelf 21. A record sheet 25 is led from a supply roll 26 over a roll 27 and thence under the shelf 21 and over the table 22 and sprocket roll 28 to a take-up roll 29. The sprocket roll 28 is driven at constant speed by a synchronous motor 30 which is connected through leads 31 and 32 with the conductors 12 and 11 respectively. The record sheet 25 is provided with spaced apertures 33 adjacent each edge adapted to engage teeth 34 and 35 upon the rolls 27 and 28 respectively so that the record sheet is caused to move along a definite path over the table 22. An arm 40 is pivotally mounted at one end upon a stud 41 projecting upwardly from the shelf 21. A stylus 42 is fixed to the arm 40 near its other end and depends therefrom through an arcuate slot 43 in the shelf 21 to contact the record sheet 25.

In the embodiment of the invention illustrated, the stylus 42 is moved transversely of the record sheet 25 in response to the position of a movable member outside of the radio receiving instrument to predetermined positions corresponding to predetermined broadcasting stations to which the radio receiving instrument 10 may be tuned. As illustrated, a Bowden wire 55 is pivotally connected to the arm 40 intermediate the ends of the latter. The Bowden wire 55 passes through a flexible conduit 56 one end of which is secured to the support 20 and the other end of which is secured to a support 57. The other end of the Bowden wire is maintained in engagement with a cam 58 by a spring 59 one end of which is connected to the arm 40 and the other end of which is connected to the support 20. The cam 58 is fixed upon a shaft 60 which is rotated in a given direction at the rate of one or two revolutions per minute by a motor 61. The cam 58 is specially constructed with a circular portion $a$, $b$, $c$, forming the high point of the cam, and a low point $d$. The circular portion may comprise 180° or 90° of the operative surface of the cam or otherwise depending upon whether the condensers C and C' are 180° or 270° respectively or otherwise constructed. When the Bowden wire 55 engages the portion $a$, $b$, $c$, the stylus 42 will be positioned at its limit of movement adjacent one edge of the record sheet 25. The stylus 42 will be positioned at its limit of movement adjacent the opposite edge of the record sheet when the Bowden wire engages the portion $d$ of the cam 58. When the Bowden wire 55 engages the portions $ad$ and $cd$ of the cam, while the latter is rotating, transversely and longitudinally inclined lines, such as lines $l$ and $r$ respectively, will be formed on the record sheet 25 by the stylus.

As previously mentioned, the design of the cam 58 will depend upon the design of the condenser used. If, instead of using a 180° condenser as illustrated in Fig. 1, a 270° condenser is employed, the surface $a$, $b$, $c$ of the cam 58 will comprise only 90° of the cam and the surface $a$, $d$, $c$ will form the remaining portion of the cam, that is, 270° of the cam.

The movable portions 65 and 65' of variable gang condensers C, C', respectively, are fixed upon the shaft 60. The condensers C, C' form part of a tuned radio frequency amplifier circuit, generally indicated at A. A lead 67 is connected to the radio receiving instrument at that point where there exists the highest level of power at the signal frequency. As illustrated the shielded lead 67 to the circuit A is energized by connection to the grid 68 of the detector tube 69 of a tuned radio frequency radio receiving instrument 10 through a condenser 70. If the radio receiving instrument is a superheterodyne set the lead 67 may be connected to the local oscillator whose frequency will be the sum of the signal frequency plus a constant intermediate frequency. The return of the shielded lead 67 is provided to the chassis of the radio 10 through shield 67' and adjustable potentiometer resistance 68'. The radio-frequency transformer primary 6 is supplied with radio-frequency power from the circuit just described. The transformer secondary 6' in combination with variable condenser C forms a tuned circuit. When the rotation of the shaft 60 has brought condenser C to the capacitance value which provides exact resonance with the frequency of the voltage provided by grid 68, a relatively large voltage is impressed upon grid 100 of the amplifier diodepentode tube IF7G. By the amplifier action of the pentode section of tube IF7G, a relatively large current of the impressed frequency is thereby allowed to flow in the pentode plate circuit of the tube. This current flows through the parallel resonant circuit of motor-driven variable condenser C' and primary winding 80' of the second radio-frequency transformer. The two diode plate elements of tube IF7G are connected together and to one terminal of the secondary winding 80 of the second radio-frequency transformer. The other terminal of secondary winding 80 is connected, through blocking condenser 99, to the cathode of the tube IF7G. The action of the circuit described is to impress a relatively high voltage of incoming signal frequency on the diode plates when, and only when, the motor driven gang condensers C and C' have capacitance values which provide resonance. When this condition exists, direct-current rectified from the radio frequency voltage flows to the diode plates through secondary winding 80, and through the high resistance 102 of preferably 500,000 ohms, through lead 53, switch 17, lead 15 and main 11. This current will flow only during the half cycle when main 11 is positive with respect to main 12.

This flow of unidirectional current through high resistance 102 causes a relatively high negative potential (with respect to cathode) at the upper end of resistance 102, and, as shown, filament 103 of tube 206 is connected directly to this negative potential. It will be observed that the cathodes of tubes 202 and 206 have a common potential. The effect of the high negative potential on grid 103 is largely to diminish the flow of current between plate 81 and cathode 205 as a consequence of which relay magnet 83 is weakened and armature 84 opens by spring action, thus interrupting the circuit carrying power to symbol motor 61 which drives condensers C and C'. Thus condensers C and C' are allowed to stop in the position which gives resonance in the tuned radio frequency amplifier circuit just described.

When the circuit is not in resonance, the grid 103 does not have a high negative potential, and sufficient plate current flows in tube IG5G to keep the relay switch 84 in the closed position. As long as this condition remains, motor 61 continues to receive power and to drive condensers C and C' in effect hunting for the resonant position.

The power supply to this circuit is entirely alternating current. During the half cycle when the plates of the tubes are negative with respect to the filaments, no current will flow, but if the relay switch 84 is closed it will continue to be held in by current supplied to the relay winding by condenser 104 parallel with said winding. The filaments are heated by the current obtained from the low-voltage secondary of power transformer 105.

Power is supplied to rotate the motor 30 at all times and, consequently, the record sheet 25 is moving at all times at a uniform desired rate. When the main switch of the radio receiving instrument 10 is turned on, power is supplied to the motor 61 to rotate the shaft 60. As the shaft rotates the stylus 42 is moved transversely of the record sheet 25 and if the shaft 60 makes more than one complete rotation before the condensers C and C' are brought to their resonant positions, the stylus will form a zigzag line H upon the record sheet. In other words, the condensers C and C' will be hunting for their resonant positions. However, as soon as the condensers C and C' are brought to their resonant positions, the switch 84 will be opened and will de-energize the motor 61 to stop rotation of the shaft 60. Consequently, the stylus will be stopped at a position transversely of the record sheet 25 corresponding to the radio frequency of the broadcasting station to which the radio receiving instrument 10 is tuned. When the stylus is thus stopped, it will produce a line upon the record sheet 25 parallel to the edges of the latter.

If the radio receiving instrument 10 is now turned off, the stylus 42 will continue to produce a line upon the record sheet 25 at a position transversely of the record sheet 25 corresponding to the broadcast station to which the radio receiving instrument 10 had previously been tuned. Consequently, it is desirable to provide means which will indicate upon the record sheet 25 the exact periods at which the radio receiving instrument is and is not tuned to a broadcast station. For this purpose, one end of an arm 180 is fixed to a stud 181 which is pivotally mounted in a bearing formed in a bracket 182 extending upwardly from and secured to the shelf 21. The other end of the arm 180 is provided with a stylus 183 extending downwardly therefrom and adapted to pass through an opening 184 in the shelf 21 to contact the record sheet 25. One end of an arm 45 is fixed to the stud 181 and has its other end secured to one end of a rod 47. The other end of the rod 47 is secured to the free end of the armature 48 of an electro-magnet 49, the other end of the armature 48 being pivotally mounted upon a support 50 carried by the body of the electromagnet 49. The electro-magnet 49 is supplied with power through leads 51 and 52 to energize the magnet, and, consequently, pivot the arm 180 to bring the stylus into contact with the record sheet 25 when the switch 17 is closed. Consequently a line L (Fig. 2) will be formed upon one edge of the record sheet 25 when the radio receiving instrument is turned on. When, however, the radio receiving instrument 10 is turned off, the electro-magnet 49 will be de-energized and the stylus 184 will be out of contact with the record sheet 25 to leave a gap in the line L as indicated at G (Fig. 2).

Many radio sets today are adapted to receive more than one frequency band. It is intended that the tuning range covered by condensers C and C' in conjunction with their respective tuning inductances 6' and 80' shall cover the most important band; that is, the broadcast band. If the radio set is being used to receive a frequency lying outside this band, then the continued rotation of motor 61 would never produce a resonant condition in the amplifier A, and switch 84 will remain closed indefinitely. The result would be a production on tape 25 of the continuous zigzag line H (Figs. 1 and 2). The interpretation of such a record is therefore that the radio set was in use but not tuned to the broadcast band.

It will be noted that in the construction specifically illustrated in Fig. 1 the condensers C and C' are 180° condensers. When the Bowden wire 55 engages the cam 58 at the point a the capacitance of the condensers is at a minimum. During the rotation of the cam 58 in the direction indicated in Fig. 1 so as to bring the point of contact of the Bowden wire progressively along the surface a, d, c, the capacitance of the condensers will vary from a minimum to a maximum. During this movement of the cam, the stylus 42 will be caused to move from its position adjacent one edge of the record sheet as illustrated across the record sheet and back to a point adjacent the edge of the record sheet from which its motion started. As the rotation of the cam 58 continues so as to cause the Bowden wire 55 to engage the cam progressively along the surface c, b, a, the stylus 42 will be maintained adjacent the edge of the record sheet as illustrated in Fig. 1 while the capacitance of the condensers C and C' is varying from a maximum to a minimum.

Figure 2:
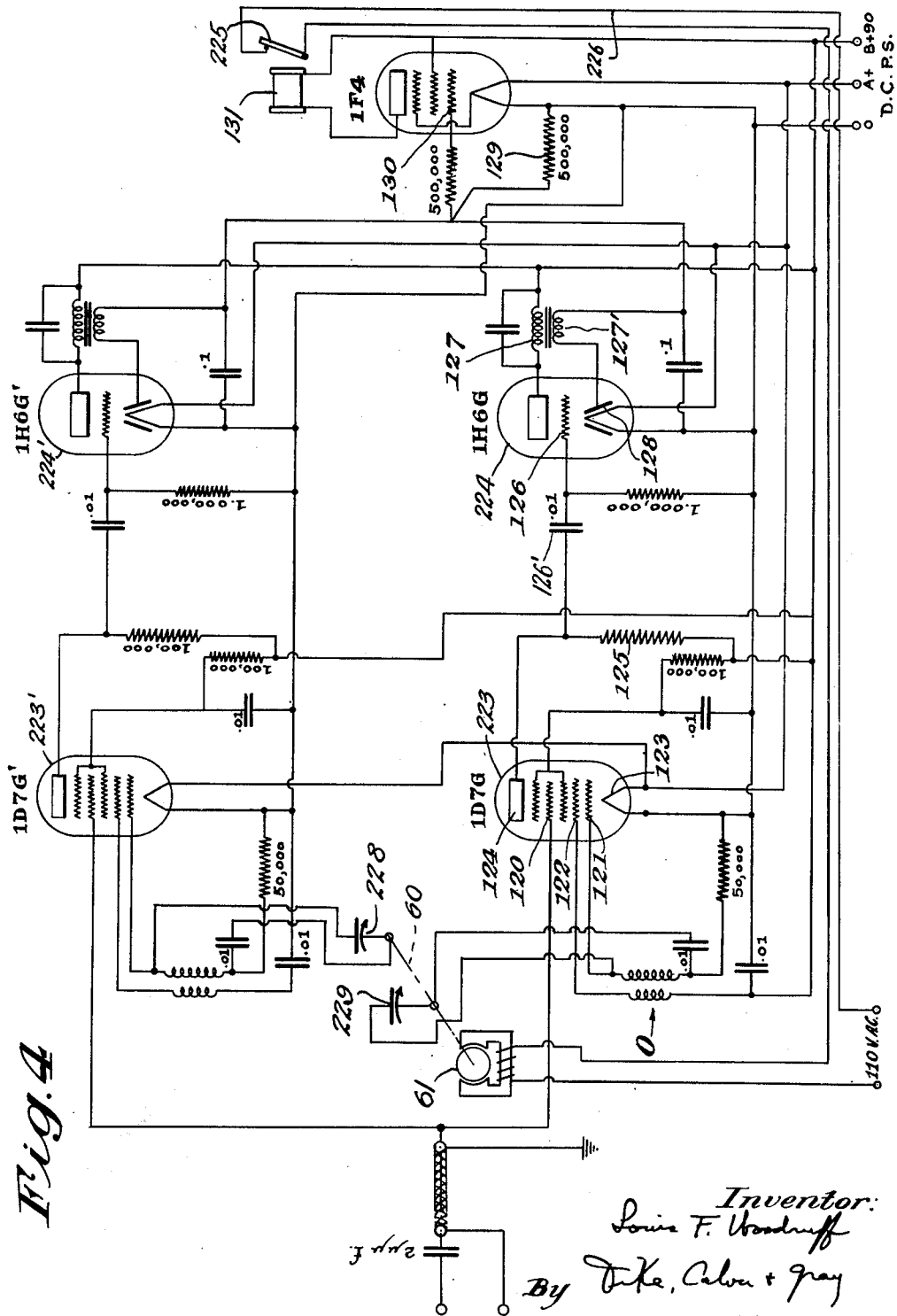
Fig. 2 is a plan view of a portion of a record sheet containing a record produced by the apparatus of the invention.

As the point of contact of the Bowden wire moves progressively from the point a upon the cam 58 to the point d, the stylus 42 will move from the right hand edge of the record sheet to the left hand edge as viewed in Figs. 1 and 2 and will produce an inclined line l upon the record sheet. If during this movement of the cam, the condensers C and C' are brought into resonance with the radio frequency received by the instrument 10, a switch 84 will be opened to stop movement of the stylus 42 in a position intermediate the edges of the record sheet such, for example, as the position indicated by the line p. The position of the line p, therefore, corresponds to a predetermined broadcasting station to which the instrument 10 is tuned.

As the point of contact of the Bowden wire 55 moves progressively from the point d upon the cam 58 to the point c, the stylus will move from the left hand edge of the record sheet to the right hand edge as viewed in Fig. 1 and will produce an inclined line r upon the record sheet. If during this movement of the cam, the condensers C and C' are brought into resonance with another radio frequency which is being received by the instrument 10, the movement of the stylus 42 will be stopped at a position indicated by the line p'. The lines p and p' although they may be correspondingly positioned transversely of the record sheet, represent different broadcasting stations to which the instrument 10 has been tuned. The broadcasting stations represented by the lines p and p' can be readily distinguished by noting the direction in which the stylus was moving just immediately prior to being stopped, that is, whether it was moving in a direction parallel to the lines l or in a direction parallel to the lines r.

As illustrated in Fig. 1, cam 7 is mounted upon the shaft 60 and is adapted to open and close the switch 7'. When the Bowden wire engages along the surface adc of the cam 58, the switch 7' is held open.

If the switch 7' is closed the condenser C whose rotor 65 is grounded, is short-circuited by having its stator also grounded through switch 7'. Consequently, no signal reaches grid 100 of tube 202, switch 84 remains closed, and no stopping of motor 61 occurs at the position corresponding to resonance. A complete revolution of motor 61 and shaft 60 causes the capacitance of C and C' to vary from minimum to maximum, and then back to minimum again, with the result that there is a double occurrence of each capacitance in the range, and two points of resonance. The purpose of switch 7' is to eliminate one of these points, so that each frequency will correspond to one and only one point of stoppage.

It will be noted that the cam 58 when constructed as illustrated serves to double the useful width of the record sheet because the stylus when moving in one direction moves through locations corresponding to one series of broadcasting stations and when moving in the opposite direction moves through locations corresponding to another series of broadcasting stations.

Figure 3:
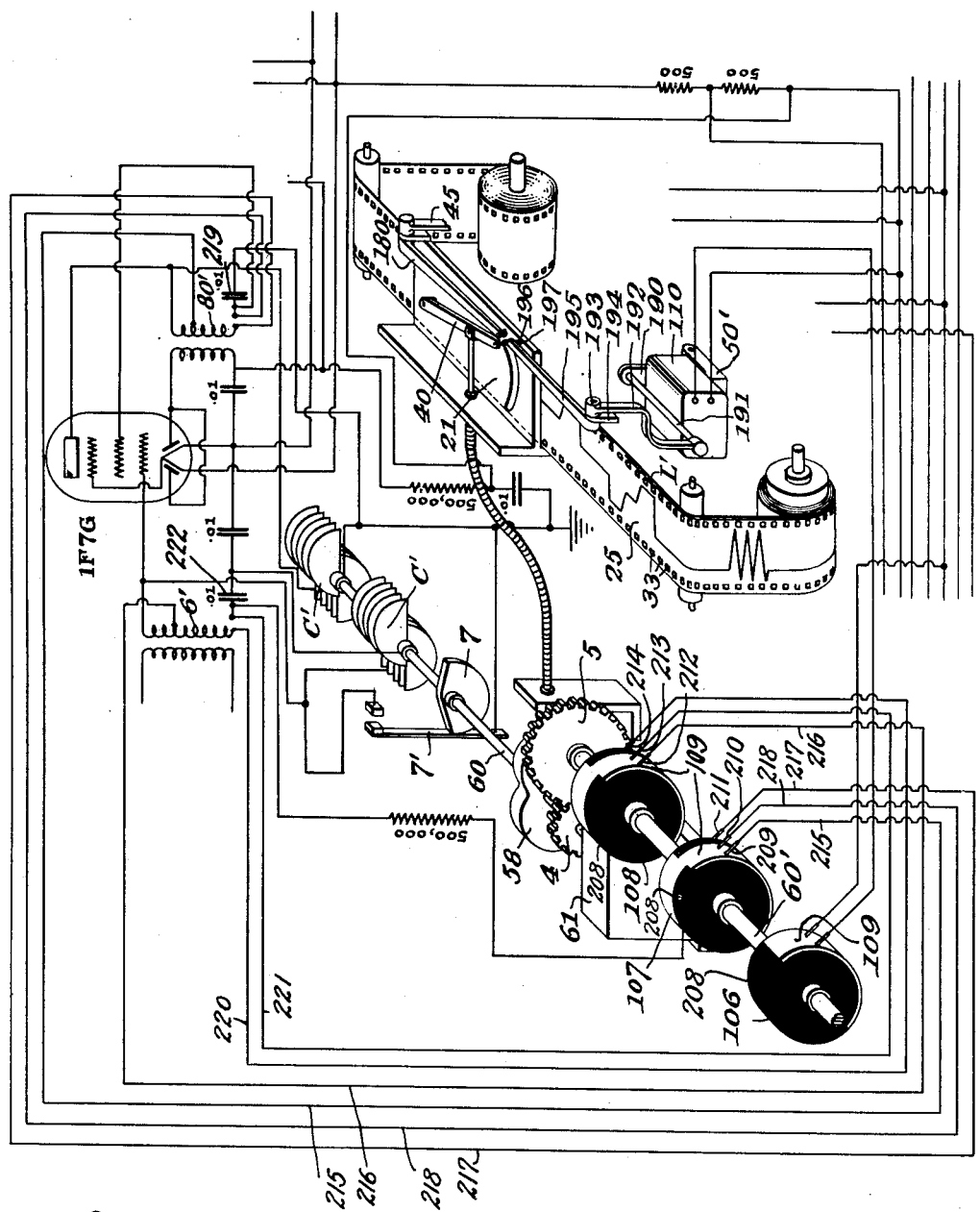
Fig. 3 is a diagrammatic view of supplementary apparatus which may be used in conjunction with that illustrated in Fig. 1.

Fig. 3 shows in detail the means for recording the frequency of the received signal from one of a plurality of frequency bands including, if desired, the broadcast band. This may form a part of the structure shown in Fig. 1, but was omitted in Fig. 1 for the sake of clarity. The structure shown in Fig. 3 is intended to include the structure shown in Fig. 1.

In Fig. 3, motor 61 which drives shaft 60, also drives shaft 60' through gears 4 and 5 on the shaft 60 and 60' respectively. The ratio of the number of teeth on gear 5 to the number on gear 4 is a small integral number, equal to the number of frequency bands to be scanned. Shaft 60' carries three commutators 106, 107 and 108, each having an electrical conductor section 109 and an insulated section 208. Three brushes 209, 210 and 211 bear upon the commutator 107 and three brushes 212, 213 and 214 bear upon the commutator 108. The brushes 209 and 212 are connected by leads 215 and 216 to corresponding points intermediate the ends of the transformer windings 6' and 80' respectively. The brushes 210 and 211 are connected by leads 217 and 218 to the transformer winding 80' and the condenser 219. The brushes 213 and 214 are connected by leads 220 and 221 to the transformer winding 6' and condenser 222. As the commutators rotate the windings 6' and 80' of the two radio frequency transformers are changed by the cutting out and in of circuit of some of their turns. The resulting change in inductance alters the frequency band which is scanned by the rotation of the variable condensers C and C'. When one of the bands is being scanned the brushes bearing on the commutator 106 remain open. During the other period these brushes are short circuited by the metal insert 109 of commutator 106, permitting electro-magnet 110 to be energized.

The armature 190 of the electro-magnet 110 is pivotally mounted at one end on a support 50'. The other end of the armature 190 is connected to one end of a rod 191, the other end of which is connected to one end of an arm 192 which has its other end fixed to a stud 193 which is rotatably mounted in a bearing in a support 194. One end of an arm 195 is fixed to the stud 193 and is provided at its other end with a stylus 196 adapted to depend through an opening 197 in the shelf 21 so as to contact the record sheets 25. Consequently, when the electro-magnet 110 is energized a line L' will be formed near one edge of the record sheet to indicate the times when the radio receiving instrument 10 is tuned into a broadcasting station having a frequency, for example, outside of the standard broadcasting band.

An optional circuit for accomplishing the results obtained with the structure of Fig. 1 is shown in Fig. 4. In this circuit the pentagrid-converter tube 223 of the 1D7G type receives voltage to its grid 120 from grid 68 (see Fig. 1) of the detector tube 69 of the radio set 10. The first two grids 121 and 122 and the cathode 123 of tube 223 are used as part of the local oscillator circuit, indicated in general by the letter O. One element of the oscillator circuit is a motor-driven variable condenser 229, similar to the condensers C and C' referred to in Fig. 1. Tube 223 thus generates a cyclically varying frequency which is mixed with the frequency supplied to grid 120, and the difference or heterodyne frequency is produced in the plate 124. A potential of this frequency is produced by the drop caused by the flow of current through the resistance 125. This potential is impressed on grid 126 of the double-diode-triode tube 224 of the 1H6G type. Current of the heterodyne frequency is produced in the plate triode circuit, but a low pass filter circuit or choke coil 127 allows only low-frequency current to pass in appreciable amount. The choke coil has a secondary 127' which is used to energize the diode plate. When variable condenser 229 is tuned so that the locally produced frequency is nearly the same as the signal frequency taken from the radio set, a relatively large diode current will flow from diode plate 128 and the voltage drop caused by this current passing through the resistance 129 renders the potential of grid 130 of the output pentode tube 1F4 more negative, and cuts off the flow of plate current from this tube through a relay 131, corresponding to the relay 83 of Fig. 1. When the current through relay 131 is cut off, the switch 225 is opened and power through the lead 226 to the condenser driving motor 61 is cut-off in the manner already explained in the description of Fig. 1.

When the local frequency is exactly the same as the signal frequency, the heterodyne frequency becomes zero and the current will not pass through the condenser 126' or the transformer 127, as shown. In order to eliminate possible failure of operation caused by inertia overshoot of the condenser driving motor which might cause this exact tuning condition to be reached, there is provided in the upper half of Fig. 4 a duplicate circuit containing tubes 223' and 244'. It will be understood that the movable parts of the condensers 229 and 228 are both carried by a shaft corresponding to the shaft 60 driven by the motor 61 as shown in Fig. 1. The output leads of the tubes 224 and 224' and their respective transformers are connected together. The local oscillators in the upper and lower halves are tuned to differ from each other by approximately 1000 cycles per second in frequency. Thus, if either half is by chance producing the exact signal frequency, the other half would produce an intermediate or heterodyne frequency of 1000 cycles per second, which can easily pass through the condensers and filters and bias the first grid 130 of the output tube 1F4 to cut off.

Fig. 5 shows another arrangement with a different circuit which may be used in place of that shown in Fig. 4. A pentode amplifier tube 6K8 is located as near as possible to the detector tube 69 of the radio set 10. The grid 140 of tube 6K8 is energized through a small condenser 150 and short lead 151 connected to the grid of the detector tube of a radio receiving instrument. A pentagrid converter tube 6A8 receives voltage from plate of the 6K8 tube through lead 154 and a pre-selector circuit embodying an inductance 157 and a variable condenser 158 mounted on a shaft similar to the shaft 60 of Fig. 1 driven by a motor 61. The first two grids 159 and 160 of the tube 6A8 and its cathode 161 form part of a local oscillator circuit, generally indicated by the letter O'. A second variable condenser 162 on the same shaft as condenser 158, forms part of this local oscillator circuit. The heterodyne frequency produced by the mixing of the locally generated frequency and the incoming frequency flows from plate 163 of tube 6A8 to an intermediate-frequency transformer 164. Condenser 158 of the pre-selector circuit and condenser 162 of the local oscillator circuit are adjusted, in relation to their respective inductance elements, so that the difference of their frequencies is the same as the frequencies to which the intermediate-frequency transformer circuits are tuned. The secondary of the intermediate-frequency transformer 164 supplies the voltage to grid 165 of the double-diode-pentode tube 6B8. Plate 166 supplies the second intermediate-frequency transformer 167. The secondary terminals of this transformer are connected to the two diode plates of the 6B8 tube. The direct-current component of the diode currents is led through resistance 168 and the drop produced thereby provides a negative grid potential upon the output tube 6Y7G, and when this is of sufficient magnitude the plate current is cut off and relay 169 is de-energized. A relatively large negative potential on the grid of the output tube is produced only when the tuning of the condenser shaft brings the preselector circuit 157 and 158 into resonance with the signal frequency and the local oscillator containing condenser 162 produces a frequency greater than the incoming frequency by just the number of cycles per second to which the intermediate-frequency transformers are tuned. Until this condition is reached relay 169 remains energized and the condenser-driving motor continues to turn. When this condition is reached the relay drops out and the motor 61 is stopped as already explained in the description of Fig. 1.

It will be understood that where the arrangement and circuit disclosed in Figs. 4 and 5 are used a switch should be used which will perform the function performed by the switch 7' in the arrangement shown in Fig. 1.

When the recorder is initially installed, the time will be noted on the record sheet at a point thereon opposite the stylus. Consequently, since the rate of speed of movement of the record sheet is known, the exact time at which each point along the record sheet comes opposite the stylus can be determined.

The arrangement as illustrated in Fig. 1, is such that when the condensers C and C' are brought into resonance with the radio frequency being received by the instrument 10, the stylus 42 will be positioned transversely of the record sheet at a location corresponding to the signal being received by the instrument 10. However, if the instrument 10 is a superheterodyne receiving instrument having a local oscillator generating a frequency different from that of the received signal, and if the lead 67 is connected to this oscillator, the output of the instrument is that generated by its local oscillator. In such case, the stylus 42 will be at a location corresponding to such frequency and the record produced may be correctly interpreted by making an allowance for such frequency difference.

I claim:

1. In a device for recording upon a continuously moving record sheet the use of a radio receiving instrument, a separate radio frequency circuit, means for connecting said circuit with a radio receiving instrument to transmit to said circuit the radio frequency to which said instrument may be tuned, a portion of said circuit including a variable condenser, mechanism adapted to adjust said condenser to bring said circuit into resonance with said transmitted frequency, means actuated by said mechanism and operative to produce a record upon said record sheet representative of said transmitted frequency when said condenser is so adjusted, and means responsive to the output of said circuit for rendering said mechanism inoperative when said condenser reaches said position of resonance.

2. In a device for recording upon a continuously moving record sheet the use of a radio receiving instrument, a movable stylus continuously engaging said record sheet, mechanism for moving said stylus transversely of said record sheet, a separate radio frequency circuit, means for connecting said circuit with a radio receiving instrument to transmit to said circuit the radio frequency to which said instrument may be tuned, a portion of said circuit including a variable condenser adapted to be moved by said mechanism to bring said circuit into resonance with said received frequency, and means responsive to the output of said circuit for rendering said mechanism inoperative when said circuit is brought into resonance with said transmitted frequency, means for altering said circuit to resonate to frequencies within different frequency ranges as said condenser is moved by said mechanism, and means rendered operative by the condition of said altering means for producing a record upon said record sheet of the broadcasting frequency range in which the broadcasting station to which said instrument is tuned is located.

3. In a device for recording upon a continuously moving record sheet the use of a radio receiving instrument, a movable stylus adapted to engage said record sheet, a movable member outside of said instrument, means for moving said stylus transversely of said record sheet to predetermined positions in response to changes in the position of said member, electrically actuated means for moving said member, means for supplying power to said means for moving said member including a pair of switches, electrically actuated means for closing one of said switches when power is supplied to said instrument, a separate radio frequency amplifier circuit having a variable condenser the movable portion of which is carried by said movable member, means for connecting said amplifier circuit with said instrument to receive in predominating amount the radio frequency to which said instrument is tuned, and means responsive to current in said amplifier circuit for opening the other of said pair of switches when said condenser is adjusted to bring the circuit of said amplifier in tune with said instrument.

4. In a device for recording upon a continuously moving record sheet the use of a radio receiving instrument, a movable stylus adapted to engage said record sheet, a rotatable member outside of said instrument, means for moving said stylus transversely of said record sheet to predetermined positions in response to changes in the position of said member, a separate radio frequency amplifier circuit having a variable condenser the movable portion of which is carried by said member, means for connecting said amplifier circuit with said instrument to receive in predominating amount the radio frequency to which said instrument is tuned, electrically actuated means for moving said member, means for supplying power to said amplifier and said means for moving said member including a pair of switches, electrically actuated means for closing one of said switches when power is supplied to said instrument, and means responsive to radio frequency current in said amplifier circuit for opening the other of said pair of switches when said condenser is adjusted to bring the circuit of said amplifier in tune with said instrument.

5. In a device for recording upon a continuously moving record sheet the use of a radio receiving instrument, a movable stylus adapted to engage said record sheet, a rotatable shaft, means for rotating the shaft in one direction only, a variable condenser having its movable part carried by said shaft whereby during each complete revolution of said shaft the capacitance of said condenser is gradually varied from a maximum to a minimum and then from a minimum to a maximum, and means for controlling the movement of said stylus including a cam carried by said shaft and an element engaging said cam, said cam having an operative concentric portion adapted to maintain said stylus at its limit of movement adjacent one edge of the record sheet while the capacitance of said condenser is varying from a maximum to a minimum, the remaining operative portion of said cam being adapted to cause movement of said stylus across the record sheet in one direction and then in the opposite direction while the capacitance of said condenser is varied from a minimum to a maximum.

6. In a device for recording upon a continuously moving record sheet the use of a radio receiving instrument, a movable stylus adapted to engage said record sheet, a rotatable shaft, means for rotating the shaft in one direction only, a variable condenser having its movable part carried by said shaft, and means for moving said stylus including a cam carried by said shaft and an element engaging said cam, said cam having a portion which is inoperative for moving the stylus and another portion which is operative for moving the stylus across the record sheet from one edge thereof to the opposite edge and return while the capacitance of the condenser is varying from a minimum to a maximum.

7. In a device for recording upon a continuously moving record sheet the use of a radio receiving instrument, a separate radio frequency circuit, means for connecting said circuit with a radio receiving instrument to transmit to said circuit the radio frequency to which said instrument may be tuned, a portion of said circuit including a variable condenser, mechanism adapted to adjust said condenser to a position having a predetermined relation to said transmitted frequency, means actuated by said mechanism and operative to produce a record upon said record sheet representative of said transmitted frequency when said condenser is so adjusted, and means responsive to the output of said circuit for rendering said mechanism inoperative when said condenser is in said position having a predetermined relation to said transmitted frequency.

8. In a device for recording upon a continuously moving record sheet the use of a radio receiving instrument, a movable stylus adapted to engage said record sheet, a separate low heterodyne frequency circuit, means for connecting said circuit with a radio receiving instrument to transmit to said circuit the radio frequency to which said instrument is tuned, said circuit including a pair of variable condensers each forming part of different local oscillator portions of said circuit and being tuned a few cycles apart, mechanism for moving said stylus transversely of said record sheet and for adjusting said condensers simultaneously, and means responsive to the output of said circuit for rendering said mechanism inoperative when either of said condensers is nearly in a position of resonance with said transmitted frequency.

9. In a device for recording upon a continuously moving record sheet the use of a radio receiving instrument, a movable stylus adapted to engage said record sheet, a separate high intermediate heterodyne frequency circuit, means for connecting said circuit with a radio receiving instrument to transmit to said circuit the radio frequency to which said instrument is tuned, said circuit having a preselector portion and a local oscillator portion each containing a variable condenser, mechanism for moving said stylus transversely of said record sheet and for adjusting said condensers simultaneously, and means responsive to the output of said circuit for rendering said mechanism inoperative when the preselector portion of said circuit is brought in a position of resonance with said transmitted frequency.

10. In a device for recording upon a continuously moving record sheet the use of a radio receiving instrument, a movable stylus adapted to engage said record sheet, a separate radio frequency circuit, means for connecting said circuit with a radio receiving instrument to transmit to said circuit the radio frequency to which said instrument may be tuned, a variable condenser forming part of said circuit and movable to different positions corresponding to different radio frequencies, means for moving said stylus transversely of said record sheet in response to changes in the position of said condenser, electrically actuated means for moving said condenser, means for supplying power to said means for moving said condenser including a pair of switches, electrically actuated means for closing one of said switches when power is supplied to said instrument, and means responsive to the output of said circuit for opening the other of said pair of switches when said condenser is in a position having a predetermined relation to the transmitted frequency.

11. In a device for recording upon a continuously moving record sheet the use of a radio receiving instrument, a radio frequency circuit separate from the instrument, means for connecting said circuit with a radio receiving instrument to transmit to said circuit a radio frequency indicative of the radio frequency to which said instrument may be tuned, a portion of said circuit including a variable impedance, mechanism adapted to adjust said impedance to a position having a predetermined relation to said transmitted frequency, means actuated by said mechanism and operative to produce a record upon said record sheet representative of said transmitted frequency when said impedance is so adjusted, and means responsive to the output of said circuit for rendering said mechanism ineffective further to adjust said impedance when said impedance is in said position having a predetermined relation to said transmitted frequency.

12. In a device for recording upon a continuously moving record sheet the use of a radio receiving instrument having tuning means, a radio frequency circuit separate from the instrument, means for connecting said circuit with the radio receiving instrument to transmit to said circuit a radio frequency indicative of the radio frequency to which said instrument may be tuned by said tuning means, a portion of said circuit including a variable impedance, means for adjusting said impedance to positions having a predetermined relation to said transmitted frequency, means actuated by said last mentioned means for producing a record upon said record sheet representative of said transmitted frequency, and means responsive to the output of said circuit for stopping said impedance adjusting means and the movement of the record producing means whenever said impedance is in a position having said predetermined relation to the frequency transmitted to said circuit as determined by the tuning means of said radio receiving instrument.

13. In a device for recording upon a continuously moving record sheet the use of a radio receiving instrument having tuning means, a radio frequency circuit separate from the instrument, means for connecting said circuit with the radio receiving instrument to transmit to said circuit a radio frequency indicative of the radio frequency to which said instrument may be tuned by said tuning means, said circuit including a portion having a local oscillator, a variable impedance for controlling the frequency of said oscillator and means for varying said impedance, said circuit also including means for heterodyning said transmitted and oscillator frequencies and means controlled in response to the heterodyne frequency for rendering said impedance varying means ineffective further to vary said impedance when said impedance has a predetermined value relative to said transmitted frequency, and means operated by said impedance varying means for producing a record upon said record sheet representative of said transmitted frequency.

14. In a device for recording upon a continuously moving record sheet the use of a radio receiving instrument having tuning means, a radio frequency circuit separate from the instrument, means for connecting said circuit with the radio receiving instrument to transmit to said circuit a radio frequency indicative of the radio frequency to which said instrument may be tuned by said tuning means, said circuit including a portion having a local oscillator for generating frequencies in the range of said transmitted frequency, a variable impedance for controlling the frequency of said oscillator and means for varying said impedance, said circuit also including means for heterodyning said transmitted and oscillator frequencies to provide a relatively low frequency, a circuit resonant at said low frequency and means controlled in response to the low frequency for rendering said impedance varying means ineffective further to vary said impedance when said impedance has a predetermined value relative to said transmitted frequency, and means operated by said impedance varying means for producing a record upon said record sheet representative of said transmitted frequency.

LOUIS F. WOODRUFF.